July 30, 1963 J. E. GORGENS ETAL 3,099,161
BIMETAL COIL FOR USE IN TEMPERATURE RECORDERS
Filed April 25, 1961 2 Sheets-Sheet 1
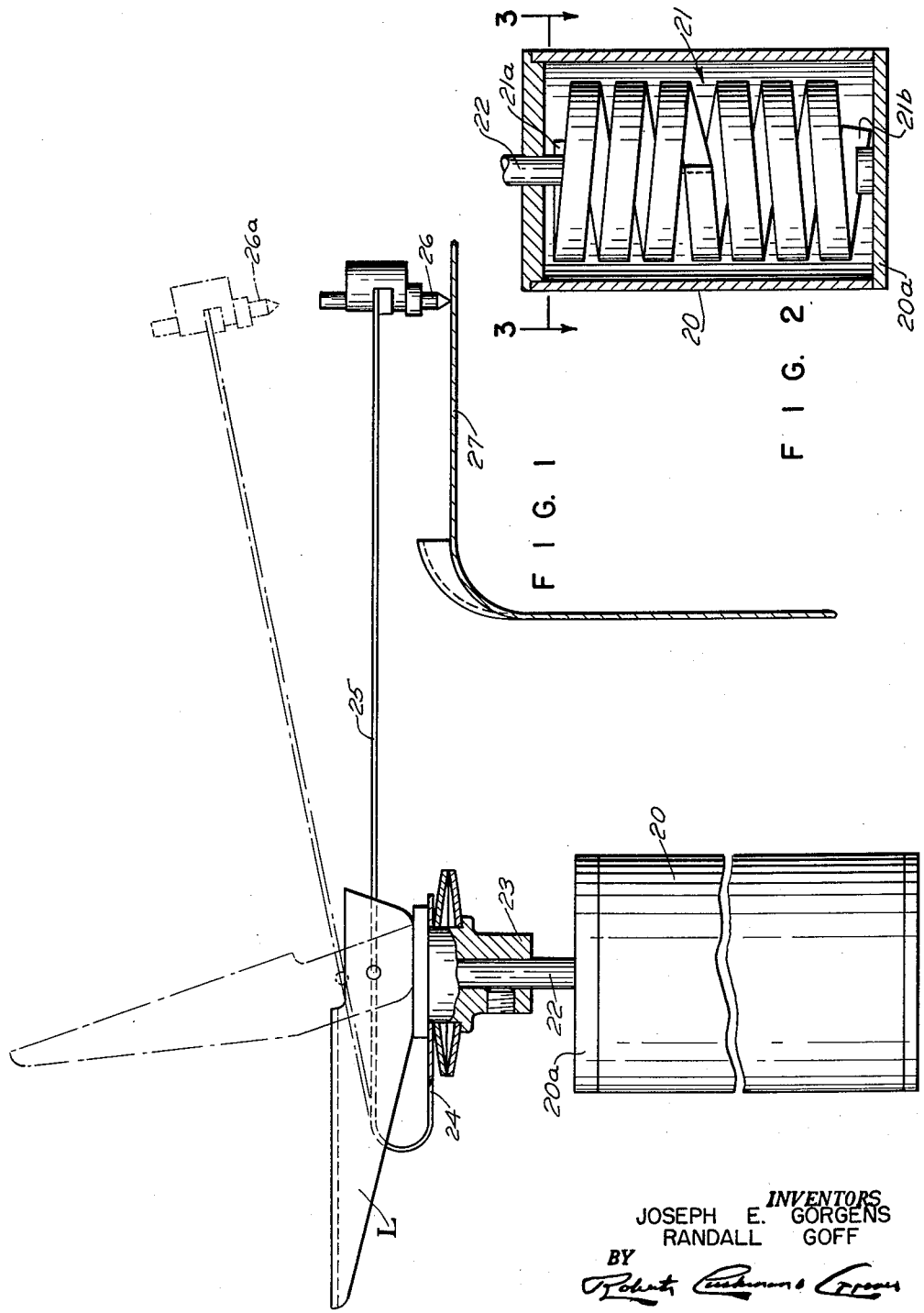
INVENTORS
JOSEPH E. GORGENS
RANDALL GOFF
BY
ATTORNEYS July 30, 1963   J. E. GORGENS ETAL   3,099,161
BIMETAL COIL FOR USE IN TEMPERATURE RECORDERS
Filed April 25, 1961   2 Sheets-Sheet 2
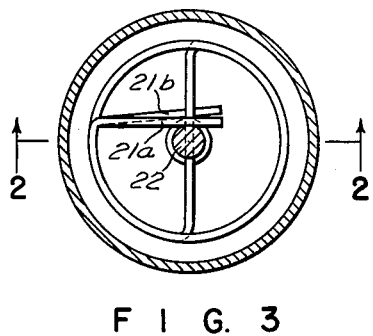
F I G. 3
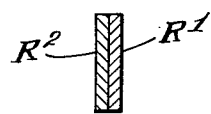
F I G. 5
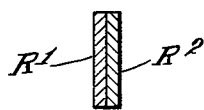
F I G. 6
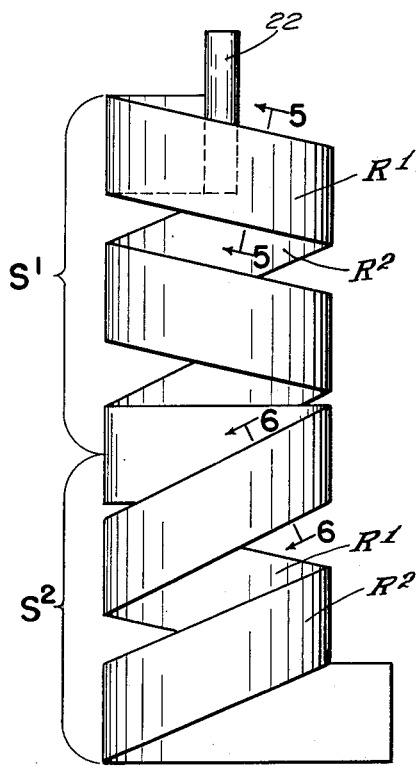
F I G. 4
INVENTORS
JOSEPH E. GORGENS
RANDALL GOFF
BY
ATTORNEYS

United States Patent Office 3,099,161
Patented July 30, 1963

3,099,161
BIMETAL COIL FOR USE IN TEMPERATURE RECORDERS
Joseph E. Gorgens, Easton, and Randall Goff, Weston, Conn., assignors to Manning, Maxwell & Moore, Incorporated, Stratford, Conn., a corporation of New Jersey
Filed Apr. 25, 1961, Ser. No. 105,420
2 Claims. (Cl. 73—363.9)

This invention pertains to instruments wherein a rotary part is required to turn in one direction or the other in response to temperature changes. For specific example and as herein illustrated and described, the instrument is a temperature recorder, but it is to be understood that the invention is broadly inclusive of applications of its novel principle to thermometers, thermostats, or other indicating or control devices. Various temperature-sensitive devices have been employed as the actuating motor means for such instruments—among them, the most common, perhaps, is a helical bimetal coil.

Bimetal material commonly comprises two registering ribbons of metal having, respectively, different coefficients of thermal expansion and which are bonded together face-to-face by welding or brazing. When such a composite material is subjected to a change in temperature, the unequal change in length of the two constituent metals causes the bimetal strip to curve. If the bimetal strip is wound into a helical coil, and so mounted that one end is fixed and the other end is free to rotate, it may then be employed as a temperature-sensing device in which a change in temperature results in an angular rotation of the free end of the coil, and said end may be coupled to a pointer, pen arm, or other indicating or controlling device so as to move the latter.

A further characteristic of such a helical bimetal coil is that, in addition to angular rotation, a temperature change produces a change in length, that is to say, motion of its free end in an axial direction. Moreover, if the coil be mechanically compressed or extended in an axial direction, the result is that the free end of the coil will rotate even though the temperature be constant. Because of these latter characteristics, such a helical bimetal coil has certain disadvantages when employed for actuating the pen arm of a recording instrument in which the pen arm is coupled directly to the free end of the coil. In such an arrangement, if the coil end moves in an axial direction in response to temperature change, the force exerted by the pen upon the recording chart will vary and may become so heavy that pen motion is retarded by friction, or so light that the pen fails to write. On the other hand, if the instrument be subjected to vibration or shock in a direction axial of the coil, the effective length of the coil may vary, with a resultant rotary motion of the free end of the coil having no relation to temperature change, causing an error in the trace made on the chart by the pen.

Aside from the disadvantages inherent in an ordinary bimetal coil, as just referred to, such a coil is very useful as a temperature-responsive motor since it may readily be designed to cover a wide temperature range and also to provide a very substantial amount of motion of the recording element, for example a pen or pointer, for each degree of temperature change.

The present invention has for an object the provision of an improved bimetal helical coil for use in recording instruments or the like, which will be substantially neutral so far as change in axial length is concerned in response to temperature variations and neutral, as to rotation, in response to mechanical force acting in an axial direction. A further object is to provide such a helical bimetal coil which is capable of imparting substantial motion to a recording pen or the like for each degree of temperature change.

Other and further objects and advantages of the invention will be pointed out in the following more detailed description and by reference to the accompanying drawings wherein:

FIG. 1 is a fragmentary, diagrammatic elevation, partly in vertical section, of a recording instrument of a generally conventional type and indicating the relation between the helical coil, the marking pen and the disc which carries the recording chart;

FIG. 2 is a fragmentary, diagrammatic section through a housing for the bimetal coil, indicating means for anchoring its lower end, and showing the upper end of the coil as attached to a pen-actuating shaft;

FIG. 3 is a section on the line 3—3 of FIG. 2;

FIG. 4 is an elevation, to larger scale than FIG. 2, showing the improved coil of the present invention, with the lower part of the pen-actuating shaft secured to the upper end of the coil;

FIG. 5 is a transverse section on the line 5—5 of FIG. 4; and

FIG. 6 is a transverse section on the line 6—6 of FIG. 4.

Referring to FIG. 1 of the drawings, wherein certain elements of a generally conventional temperature recorder are illustrated, the numeral 20 designates a housing for the bimetallic coil 21 (FIGS. 2 and 4) embodying the present invention, whose upper end 21a (FIGS. 2 and 3) is secured, for example, by solder to the rotary vertical shaft 22, which turns in suitable bearings in the top 20a of the housing. The lower end 21b of the coil 21 is fixed in any suitable way to the lower end member 20a of the housing (FIG. 2). To the upper end of the shaft 22 there is fixed a member 23 on which one end 24 of a long resilient arm 25 is mounted so as to turn with the shaft, this arm supporting the pen 26 at its free end. This pen is provided with ink in customary manner and is operative to form a trace upon a record disc carried by a rotary table 27. Conventional means, including a lever L, provides for holding the pen in normal position, but at will, to allow the pen 26 to rise to a position such as that indicated at 26a in FIG. 1, so that a record chart or disc may be placed upon or removed from the rotary table 27.

The parts, as thus far described, are of generally conventional type with the exception of the bimetal coil 21, and further description of the details of construction of the recording instrument are unnecessary.

Referring to FIGS. 2, 4, 5 and 6, the coil, as shown, consists of a length of bimetal ribbon consisting of two plies $R^1$ and $R^2$, welded together in face-to-face relation, the ply $R^1$ having a higher coefficient of thermal expansion than the ply $R^2$. Such a bimetal ribbon is old and well-known in the art. However, in accordance with the present invention, the coil 21, as here shown, is wound from a single length of the bimetal ribbon, but so as, in effect, to form two helical sections $S^1$ and $S^2$ respectively of opposite hand, joined at the midpoint of the complete coil by a cross-over member. One section $S^1$ of the coil is wound with the high expansion ply $R^1$, at the outer surface of the coil, while the other section $S^2$ of opposite hand is wound with the high expansion ply $R^1$ at the inner side. This is illustrated in FIGS. 5 and 6, which are sections on the lines 5—5 and 6—6 respectively, at the upper and lower portions of the coil.

With this arrangement an increase in temperature results in rotation of both sections of the coil in the same direction and thus the angular rotation of the shaft 22 equals the sum of the rotations of the two sections. However, under the same conditions, the section $S^1$ having the high expansion ply $R^1$ at the outside will decrease in length, while the section $S^2$ having the high expansion ply $R^1$, at the inside of the coil, will increase in length, so that the coil, as a whole, is neutral so far as length variation is concerned.

In the coil, as constructed, equal lengths of the bimetal ribbon constitute the upper and lower sections $S^1$ and $S^2$ of the coil which are of opposite hand, respectively, and thus, with this arrangement, temperature variation does not cause any change in length of the coil as a whole.

Conversely, if, by the application of mechanical force applied in an axial direction the coil is stretched or compressed, the two sections $S^1$ and $S^2$ rotate in opposite directions because their helices are of opposite hand and thus the net rotation of the output shaft is zero.

Thus, with this arrangement, a composite coil of a given length produces an angular rotation of the output shaft 22 in response to temperature change, equal to that of a simple coil of the same length and of the same hand throughout, made in accordance with customary procedures, but is neutral as respects variation in axial length in response to temperature change, and is further neutral, so far as rotation of the output shaft is concerned, in response to the application of axially applied mechanical force.

While the coil, as herein shown, is wound from a single length of bimetal material, it is obvious that it could also be made by joining two separate helical coils of opposite hand and having their high expansion plies, respectively, inside and outside.

While one desirable embodiment of the invention has herein been disclosed by way of example, it is to be understood that the invention is broadly inclusive of any and all modifications falling within the scope of the appended claims.

We claim:

1. In a temperature responsive instrument, a rotatable member, a temperature sensitive coil drivingly connected at one end to said member, and means fixing the other end of said coil, said coil comprising a pair of coaxial sections joined at their next adjacent ends, each coil section consisting of a helically wound untwisted bimetal strip, said sections being helically wound in opposite directions with the side of the bimetal having the higher coefficient of expansion being on the inside of one coil section and on the outside of the other coil section.

2. In a temperature recorder of the type having a marking instrument adapted to provide visible indicia and a temperature sensitive coil for driving the pen; said coil comprising a pair of coaxial coil sections joined at their next adjacent ends, each coil section consisting of a helically wound untwisted bimetal strip, said coil sections being helically wound in opposite directions with the side of the bimetal having the higher coefficient of expansion being on the inside of one coil section and on the outside of the other coil section, means fixing one end of said coil, a rotatable shaft extending axially of the coil and fixed to the other end of the coil for rotational and axial movement therewith, and an elongated arm mounting the marking instrument at one end thereof, said arm being mounted for rotation with said shaft and extending angularly thereof.

References Cited in the file of this patent

UNITED STATES PATENTS

| | | |
|---|---|---|
| 1,933,801 | Hart | Nov. 7, 1933 |
| 2,028,969 | Dillon | Jan. 28, 1936 |
| 2,060,984 | Fraher et al. | Nov. 17, 1936 |
| 2,425,687 | Savolainen | Aug. 12, 1947 |